US012726093B2

(12) United States Patent
Matsuya et al.

(10) Patent No.: US 12,726,093 B2
(45) Date of Patent: Sep. 1, 2026

(54) WINDING FIELD ROTOR MANUFACTURING METHOD, WINDING FIELD ROTOR MANUFACTURING DEVICE, WINDING FIELD ROTOR, AND WINDING FIELD ROTATING ELECTRIC MACHINE

(71) Applicant: Nissan Motor Co., Ltd., Yokohama (JP)

(72) Inventors: Tomiaki Matsuya, Kanagawa (JP); Tomoya Ishikawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 226 days.

(21) Appl. No.: 18/843,799

(22) PCT Filed: Mar. 9, 2022

(86) PCT No.: PCT/JP2022/010373
§ 371 (c)(1),
(2) Date: Sep. 4, 2024

(87) PCT Pub. No.: WO2023/170836
PCT Pub. Date: Sep. 14, 2023

(65) Prior Publication Data

US 2025/0183773 A1 Jun. 5, 2025

(51) Int. Cl.

| | |
|---|---|
| ***H02K 15/122*** | (2025.01) |
| ***H02K 3/44*** | (2006.01) |
| ***H02K 3/48*** | (2006.01) |

(52) U.S. Cl.
CPC ............ *H02K 15/122* (2025.01); *H02K 3/44* (2013.01); *H02K 3/48* (2013.01)

(58) Field of Classification Search
CPC .......... H02K 15/122; H02K 3/44; H02K 3/48; H02K 3/527; Y02T 10/64
USPC ............................................... 310/45; 29/598
See application file for complete search history.

(56) References Cited

U.S. PATENT DOCUMENTS 4,409,502 A * 10/1983 McCabria ................ H02K 3/24 310/214
6,133,668 A * 10/2000 Huang ..................... H02K 7/04 310/263
2016/0099624 A1* 4/2016 Himmelmann .......... H02K 3/46 310/214

(Continued)

FOREIGN PATENT DOCUMENTS

JP 2004-173452 A 6/2004
JP 6451856 B2 1/2019

OTHER PUBLICATIONS

Extended European Search Report received for EP Application No. 22930164.3, mailed on Mar. 24, 2025, 11 pages.

*Primary Examiner* — Ahmed Elnakib
(74) *Attorney, Agent, or Firm* — Spencer Fane LLP

(57) ABSTRACT

A manufacturing method and a manufacturing device for manufacturing a winding field rotor in which it is possible to coat the entirety of coil surfaces with varnish, without requiring a complicated operation or action. The manufacturing method for a wound-field rotor involves supplying a varnish material through a gap between the rotor shaft and the flange part on one axial-end side to immerse the coil end part on the one axial-end side at a lower side of the rotor assembly in the varnish material, while rotating the rotor assembly whose axial direction is aligned horizontally.

12 Claims, 5 Drawing Sheets

(56) References Cited

U.S. PATENT DOCUMENTS

| | | | | |
|---|---|---|---|---|
| 2019/0296600 | A1* | 9/2019 | Mikati | H02K 1/26 |
| 2025/0183773 | A1* | 6/2025 | Matsuya | H02K 3/48 |

* cited by examiner

WINDING FIELD ROTOR MANUFACTURING METHOD, WINDING FIELD ROTOR MANUFACTURING DEVICE, WINDING FIELD ROTOR, AND WINDING FIELD ROTATING ELECTRIC MACHINE

CROSS-REFERENCE TO RELATED APPLICATIONS

This application is a U.S. national stage application of International Application No. PCT/JP2022/010373, filed on Mar. 9, 2022.

BACKGROUND

Technical Field

The present invention relates to a method for manufacturing a winding field rotor, a device for manufacturing a winding field rotor, a winding field rotor, and a winding field rotating electric machine, and more specifically relates to: a method for manufacturing a winding field rotor and a device for manufacturing a winding field rotor in which it is possible to coat the entirety of coil surfaces with varnish, without requiring a complicated operation or action; and a winding field rotor and a winding field rotating electric machine in which the entirety of coil surfaces is coated with varnish.

Background Information

Conventionally, for example, Japanese Patent No. 6,451,856 (hereinafter referred to as Patent Document 1) discloses a rotating electric machine cooling structure with which it is possible to inexpensively and efficiently cool a motor. The rotating electric machine cooling structure comprises a refrigerant outlet that is opened in a refrigerant supply passage so that refrigerant is dispersed toward a coil end of a stator as a rotor rotates. Furthermore, the rotating electric machine cooling structure is characterized in that the proportion of the coil end that is shielded from refrigerant by a shielding wall provided to a refrigerant dispersion path between the refrigerant outlet and the coil end is low when the rotor makes a small number of rotations and is high when the rotor makes a large number of rotations. The rotating electric machine cooling structure also can be applied to a winding field rotating electric machine provided with a winding field rotor in which a plurality of coils are wound around a rotor core.

SUMMARY

However, it is known that in cases where a coil of a winding field rotor such as that disclosed in Patent Document 1 is coated with varnish, air or the like accumulates between the coils and makes it difficult to coat the entirety of coil surfaces, including coil surfaces between the coils, with the varnish. Therefore, when the surfaces of the coils of such a winding field rotor were coated with the varnish through immersion, it has been necessary to perform a complicated operation for, inter alia, tilting the winding field rotor so that air readily escapes and then immersing the winding field rotor in a varnish material.

In view of the aforementioned problems in the prior-art technology, it is an object of the invention to provide: a method for manufacturing a winding field rotor and a device for manufacturing a winding field rotor in which it is possible to coat the entirety of coil surfaces with varnish, without requiring a complicated operation or action; and a winding field rotor and a winding field rotating electric machine in which the entirety of coil surfaces is coated with varnish.

The inventors perfected the present invention after discovering, as a result of thorough investigations for the purpose of achieving the aforementioned object, that using a winding field rotor assembly provided with prescribed end rings and immersing, in a varnish material, a coil end part on one axial-end side at the lower side of the rotor assembly while the rotor assembly is caused to rotate about an axis, the axial direction of the rotor assembly being positioned along a horizontal direction, makes it possible to achieve the aforementioned object.

Specifically, the method for manufacturing a winding field rotor according to the present invention involves manufacturing a winding field rotor (described later). The winding field rotor comprises a rotor shaft, a rotor core that is fixed to an outer periphery of the rotor shaft and that has a plurality of slots as well as coils provided to the slots, and end rings that are fixed to both axial ends of the rotor core. The coils are coated with varnish and have coil end parts that protrude from both end surfaces of the rotor core and are intermittently or continuously disposed on peripheral edge parts of both end surfaces. The end rings each have a peripheral surface part that covers an entirety of the outer-peripheral side of the coil end parts, and a flange part that protrudes radially inward from an axial-end side of the peripheral surface part. In the aforementioned method for manufacturing a winding field rotor, when the varnish is to be coated onto the coils of the winding field rotor described above, in a rotor assembly before the coils are coated with the varnish, a varnish material is supplied through a gap between the rotor shaft and the flange part on one axial-end side to immerse, in the varnish material, the coil end part on the one axial-end side at the lower side of the rotor assembly while the rotor assembly is caused to rotate about an axis, the axial direction of the rotor assembly being positioned along a horizontal direction.

A device for manufacturing a winding field rotor according to the present invention manufactures the winding field rotor described above. The device for manufacturing the winding field rotor described above comprises: a rotary device that causes the rotor assembly before the coils of the winding field rotor described above are coated with the varnish to rotate about an axis, the axial direction of the winding field rotor being positioned along a horizontal direction; and a varnish material supply tank by which a varnish material is supplied through a gap between the rotor shaft and the flange part on one axial-end side to immerse, in the varnish material, the coil end part on the one axial-end side at the lower side of the rotor assembly.

A winding field rotor according to the present invention comprises a rotor shaft, and a rotor core that is fixed to an outer periphery of the rotor shaft and that has a plurality of slots as well as coils provided to the slots. The coils are coated with varnish and have coil end parts that protrude from both end surfaces of the rotor core and are intermittently or continuously disposed on peripheral edge parts of both end surfaces. The winding field rotor furthermore comprises end rings that are fixed to both axial ends of the rotor core. The end rings each have a peripheral surface part that covers an entirety of the outer-peripheral side of the coil end parts, and a flange part that protrudes radially inward from an axial-end side of the peripheral surface part.

A winding field rotating electric machine according to the present invention comprises a winding field stator provided with an annular stator core and a coil provided to the stator core, and a winding field rotor disposed inside the winding field stator. The winding field rotating electric machine is characterized in that the winding field rotor therein is the winding field rotor described above.

According to the present invention, the above-described winding field rotor assembly provided with end rings is used, and a coil end part on one axial-end side at the lower side of the rotor assembly is immersed in a varnish material while the rotor assembly is caused to rotate about an axis, the axial direction of the rotor assembly being positioned along a horizontal direction. Therefore, it is possible to provide: a method for manufacturing a winding field rotor and a device for manufacturing a winding field rotor in which it is possible to coat the entirety of coil surfaces with varnish, without requiring a complicated operation or action; and a winding field rotor and a winding field rotating electric machine in which the entirety of coil surfaces is coated with varnish.

BRIEF DESCRIPTION OF THE DRAWINGS

Referring now to the attached drawings which form a part of this original disclosure, selected embodiments of this disclosure are illustrated.

DETAILED DESCRIPTION OF EMBODIMENTS

A method for manufacturing a winding field rotor, a device for manufacturing a winding field rotor, a winding field rotor, and a winding field rotating electric machine according to the present invention are described in detail below. In the descriptions given below, the "winding field rotor," the "winding field rotating electric machine," and the "winding field stator" are, at times, referred to simply as the "rotor," the "rotating electric machine," and the "stator," respectively.

Figures 1, 2:
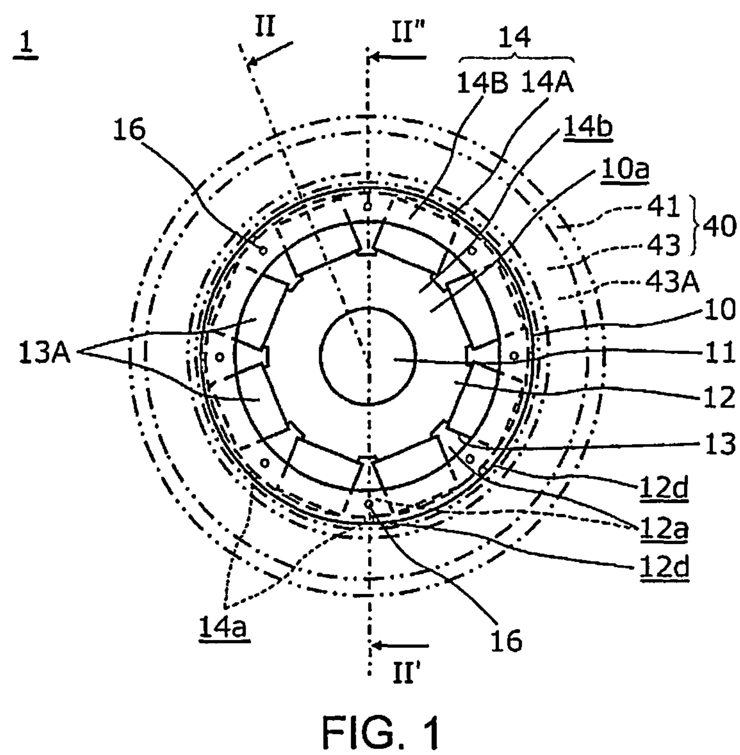
FIG. 1 is an end-surface view schematically showing a first embodiment of the winding field rotating electric machine according to the present invention.
FIG. 2 is a cross-sectional view in which the winding field rotating electric machine shown in FIG. 1 is sectioned along line II-II'.

As shown in FIGS. 1 and 2, a winding field rotating electric machine 1 according to a first embodiment comprises a winding field stator 40 that is provided with an annular stator core 41 and a coil 43 provided to the stator core 41, and a winding field rotor 10 according to the first embodiment that is disposed inside the winding field stator 40. The present embodiment is provided with a so-called distributedly wound coil 43 in which coil end parts 43A of the coil 43 are continuously disposed in plan view from an axial-end side. However, in the present invention, it is also possible to provide a so-called concentratedly wound coil 43 in which the coil end parts 43A are intermittently disposed.

The rotor 10 comprises a rotor shaft 11, and a rotor core 12 that is fixed to an outer periphery of the rotor shaft 11 and that has a plurality of slots 12*a* as well as coils 13 provided to the slots. The number of slots 12*a* in the present invention is not particularly limited; however, in the present embodiment, there are eight slots 12*a*.

The coils 13 have coil end parts 13A that protrude from both end surfaces 12*b*, 12*b* of the rotor core 12 and are intermittently disposed on peripheral edge parts 12*c* of both end surfaces 12*b*, 12*b*. The coils 13 of the rotor 10 are coated with varnish (not shown). The present embodiment is provided with so-called concentratedly wound coils 13 in which the coil end parts 13A are intermittently disposed on both end surfaces 12*b*, 12*b*. However, in the present invention, it is also possible to provide a so-called distributedly wound coil 13 in which the coil end parts 13A are continuously disposed on both end surfaces 12*b*, 12*b*.

The rotor 10 also comprises end rings 14, 14 that are fixed to both ends of the rotor core 12 in an axial direction (the left-right direction in FIG. 2).

The end rings 14 each have a peripheral surface part 14A that covers an entirety of the outer-peripheral side of the coil end parts 13A, and a flange part 14B that protrudes radially inward from an axial-end side of the peripheral surface part 14A. The flange parts 14B cover portions of the coil end parts 13A in plan view from the axial-end side.

Figure 3:
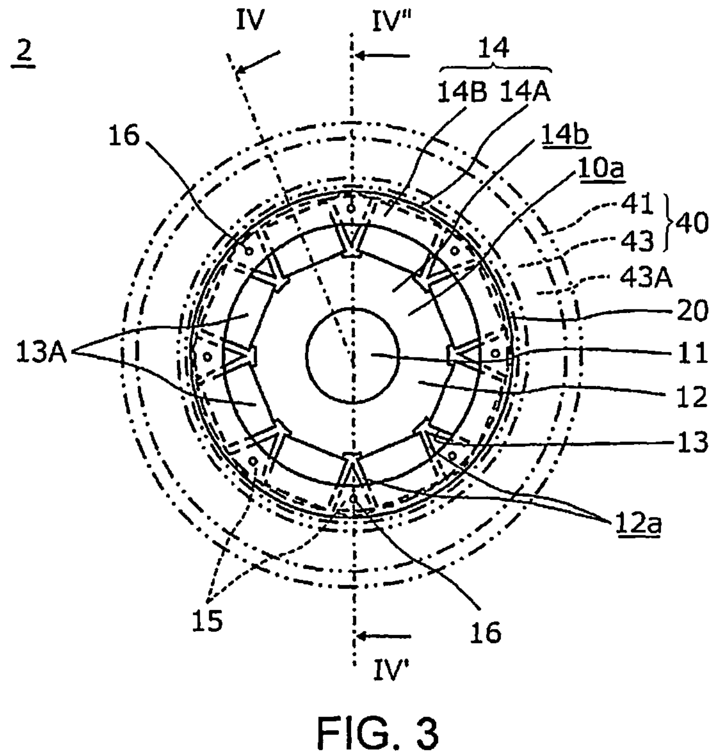
FIG. 3 is an end-surface view schematically showing a second embodiment of a winding field rotor according to the present invention.
Figure 4:
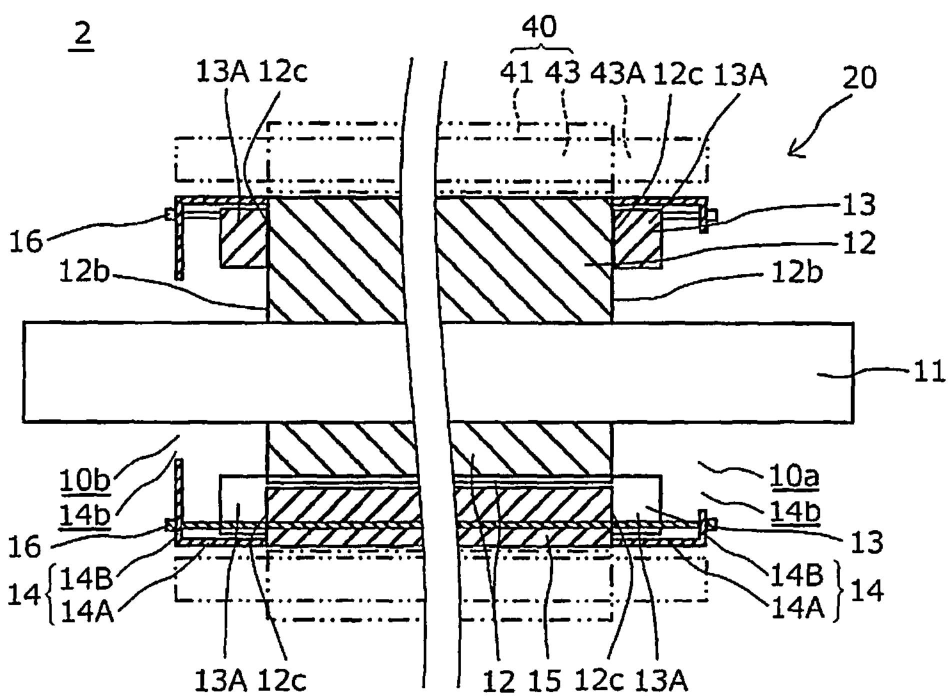
FIG. 4 is a cross-sectional view in which the winding field rotor shown in FIG. 3 is sectioned along line IV-IV'.

In the present embodiment, the inside diameter of circular openings 14*b* formed by the flange parts 14B of the end rings 14 on the two axial-end sides are the same, but the present invention is not limited in this regard (refer to FIGS. 3 and 4). Additionally, in the present embodiment, the peripheral surface parts 14A have a plurality of holes 14*a* passing therethrough in a radial direction, but the present invention is not limited in this regard (refer to FIGS. 3 and 4).

In the present embodiment, the peripheral surface parts 14A abut the end surfaces 12*b*, and the end rings 14 are fixed to the rotor core 12 using fastening members 16 composed of bolts and nuts, but the present invention is not limited to such a fixing structure. For example, the present invention can be structured such that the end parts of the rotor core 12 are fitted into the end rings 14, although this is not shown in the drawings. Furthermore, for example, the present invention can be structured such that a difference in level is provided to either engagement site or both engagement sites between the rotor core 12 and the end rings 14 so that the rotor core 12 is readily fitted into the end rings 14, although this is not shown in the drawings.

The rotating electric machine 1 having the structure described above is capable of energizing the coils 13, 43 and functioning as an electric motor, and is also capable of functioning as an electric generator that generates electric power using drive power transmitted to the rotating electric machine 1 from the outside. Additionally, when applied to a vehicle, the rotating electric machine can adjust the energization of the coils 13 when the vehicle travels in a low-torque region at medium to high speed to adjust a magnetic field, and it is also possible to raise the efficiency of the rotating electric machine during such travel.

Because the rotor 10 according to the present embodiment comprises the end rings 14 described above, it is possible to coat the entirety of the surfaces of the coils 13 with varnish, i.e., to adequately impregnate the coils with the varnish. More specifically, through a method (described later) for manufacturing a rotor using a rotor assembly 10A (refer to FIG. 5), it is possible to realize desired immersion in which air readily escapes from one axial-end side while a varnish material is supplied to the coils 13 from the other axial-end side, without requiring a complicated operation. As a result, it is possible to coat the entirety of the surfaces of the coils 13 with the varnish and to improve the reliability and durability of the rotor.

Additionally, in the rotor 10 according to the present embodiment, the inside diameters of the circular openings 14*b* formed by the flange parts 14B of the end rings 14 on both axial-end sides are the same; therefore, when the rotor 10 is used in the rotating electric machine 1 and the rotation speed of the rotor 10 changes, balance between the stresses generated at the two ends of the rotor 10 is readily achieved.

Furthermore, in addition to the advantages described above, the rotating electric machine 1 according to the present embodiment presents an advantage in making it possible to provide a rotating electric machine in which no magnets are used.

Additionally, in the rotating electric machine 1 according to the present embodiment, oil or another refrigerant is supplied to the coils 13, specifically the coil end parts 13A, of the rotor 10 to cool the rotor 10. Moreover, in the rotor 10 according to the present embodiment, the peripheral surface parts 14A have the plurality of holes 14*a*, therefore making it possible for the refrigerant supplied to the coil end parts 13A of the rotor 10 while the rotor 10 is rotating to be passed through the plurality of holes 14*a* due to centrifugal force and supplied to the stator 40 in cases where such cooling is performed. As a result, the stator core 41 and the coil 43, particularly the coil ends 43A, of the stator 40 can be cooled.

The specifications and material types of the constituent elements shall now be described in further detail.

For the stator core 41, e.g., a well-known prior-art stator core in which electromagnetic steel sheets or the like are stacked together can be used as appropriate. For the coil 43, e.g., a well-known prior-art coil composed of copper or another metal can be used as appropriate. The coil 43 can have an insulation coating film.

For the rotor shaft 11, e.g., a well-known prior-art rotor shaft can be used as appropriate. For the rotor core 12, e.g., a well-known prior-art rotor core in which electromagnetic steel sheets or the like are stacked together as described above can be used as appropriate. For the coils 13, e.g., coils identical to those used in the stator described above can be used as appropriate. For the varnish, e.g., a well-known prior-art varnish that can be applied to automobile drive motors can be used as appropriate.

Examples of the end rings 14 include components formed from steel sheets or another type of metal sheet using bending or welding. The inside diameter of the circular opening 14*b* formed by the flange part 14B of the end ring 14 on one axial-end side can be set greater than the inside diameter of the circular opening 14*b* formed by the flange part 14B of the end ring 14 on the other axial-end side. In such a case, the flange part 14B on the other axial-end side preferably covers the entirety of the coil end part 13A in plan view on the axial-end side (refer to FIG. 4).

FIGS. 3 to 8 illustrate a second embodiment of the rotor and the rotating electric machine according to the present invention, and first and second embodiments of a device for manufacturing a rotor. In the embodiments described below, constituent portions that are the same as those in the first embodiment are assigned the same reference symbols and are not described in detail.

As shown in FIGS. 3 and 4, a winding field rotating electric machine 2 according to a second embodiment has the same structure as the winding field rotating electric machine 1 according to the first embodiment, except that a winding field rotor 20 according to the second embodiment has the structures (1) to (3) described below.

(1) The rotor 20 furthermore comprises a slot seal 15 for sealing openings 12*d* of the slots 12*a* in the outer-peripheral-surface side of the rotor core 12, the slot seal 15 being fixed to the rotor core 12.

(2) In the present embodiment, the inside diameter of a circular opening 14*b* formed by the flange part 14B of the end ring 14 on the one axial-end side (the right side in FIG. 4) is greater than the inside diameter of a circular opening 14*b* formed by the flange part 14B of the end ring 14 on the other axial-end side.

(3) In the present embodiment, the peripheral surface part 14A does not have holes 14*a*.

Because the rotor 20 and the rotating electric machine 2 according to the present embodiment have the structures (1) to (3) described above, it is possible to more reliably coat the entirety of the surfaces of the coils 13 with varnish, in addition to the advantages of the first embodiment. More specifically, through a method for manufacturing a rotor using a rotor assembly 20A (refer to FIGS. 5 and 8), it is possible to realize desired immersion in which air more readily escapes from one axial-end side while a varnish material is supplied to the coils 13 from the other axial-end side, without requiring a complicated operation, and to more reliably coat the entirety of the surfaces of the coils 13 with the varnish.

Because the rotating electric machine 2 according to the present embodiment has the structure (1) described above, when oil or another refrigerant is supplied to the coils 13 of the rotor 10 to cool the rotor 10, the presence of the refrigerant in a gap between the rotor 10 and the stator 40 can be suppressed or prevented. As a result, it is possible to suppress or prevent the effect of friction between the rotor 10 and the stator 40 and to improve the efficiency of the rotating electric machine.

The specifications and material types of the slot seal 15 shall now be described in further detail.

The slot seal 15 is to be capable of sealing the openings 12*d* of the slots 12*a*, and the shape and material of the slot seal 15 are not particularly limited. For example, in the second embodiment, a cylinder that is fan-shaped in plan view from the axial-end side is used. In cases where, for example, the gap between slots 12*a* where the coils 13 are provided is small, it is preferable to use a thin sheet. The thin sheet preferably has substantially the same curvature as the outer peripheral surface of the rotor 10. Examples of the material of the slot seal 15 include resins and metals.

Figure 5:
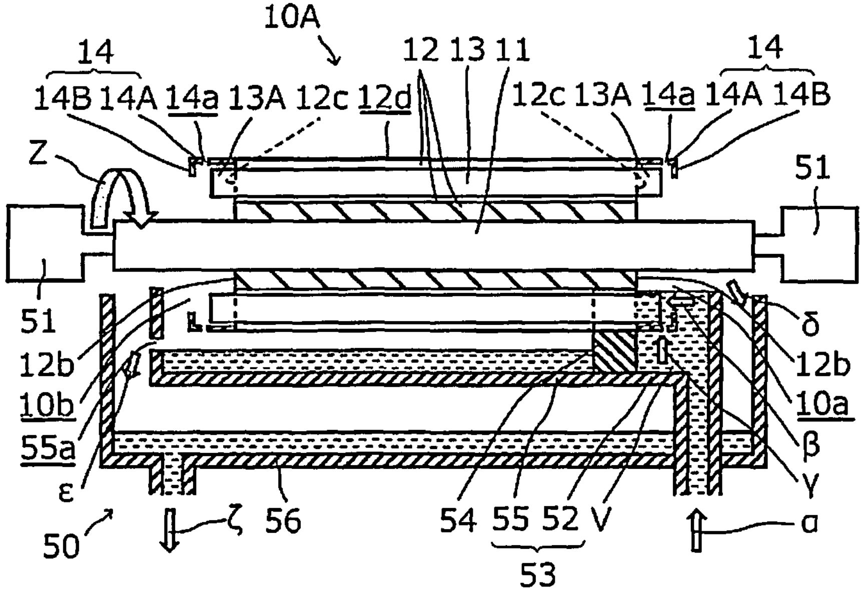
FIG. 5 is a cross-sectional view schematically showing a first embodiment of a device for manufacturing a winding field rotor according to the present invention.
Figure 8:
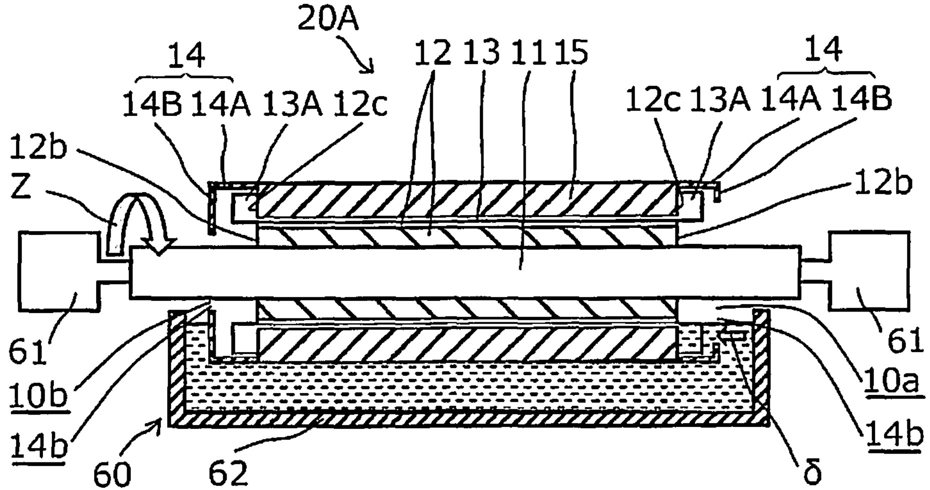
FIG. 8 is a cross-sectional view schematically showing a second embodiment of the device for manufacturing a winding field rotor according to the present invention.

The method for manufacturing a winding field rotor according to the present embodiment is suitable for manufacturing the rotor 10, 20 according to the first or second embodiment described above, the method including manufacturing a winding field rotor 10, 20 obtained by coating coils 13 in a rotor assembly 10A, 20A with varnish (refer to FIGS. 5 and 8).

In the method for manufacturing a rotor according to the present embodiment, when the varnish is to be coated onto the coils 13 in the rotor assembly 10A, 20A, a varnish material is supplied through a gap 10*a* between a rotor shaft 11 and a flange part 14B on one axial-end side to immerse, in the varnish material, a coil end part 13A on the one axial-end side at the lower side of the rotor assembly 10A, 20A while the rotor assembly 10A, 20A is caused to rotate about an axis, the axial direction of the rotor assembly 10A, 20A being positioned along a horizontal direction. In the present embodiment, the method for supplying the varnish material is not particularly limited. For example, the varnish material can be supplied into an end ring 14 through the gap 10*a* between the rotor shaft 11 and the flange part 14B on the one axial-end side using a varnish material supply pipe. If the varnish material is supplied using a varnish material supply pipe, then the outer peripheral surface of the end ring can be prevented from being immersed in the varnish material.

The rotation speed when the rotor assembly 10A, 20A is caused to rotate about the axis can be adjusted as appropriate in accordance with the viscosity of the varnish material forming the varnish described above.

For example, in cases where the viscosity of the varnish material is relatively low, the coils 13 are readily impregnated with the varnish material; therefore, it is preferable to cause the rotor assembly 10A, 20A to rotate at a relatively low rotation speed and in an intermittent manner about the axis in order to complete impregnation of each of the coils 13 between the slots 12*a* with the varnish material.

However, in cases where the viscosity of the varnish material is relatively high, the coils 13 are not readily impregnated with the varnish material; therefore, it is preferable to cause the rotor assembly 10A, 20A to rotate at a relatively high rotation speed and in a continuous manner about the axis in order to impregnate the coils 13 in the slots 12*a* with the varnish material in small amounts at a time.

In the method for manufacturing a winding field rotor according to the present embodiment, after the varnish material is applied to the entirety of the surfaces of the coils 13 of the rotor assembly 10A, 20A, immersion of the rotor assembly 10A, 20A in the varnish material is ended. Surplus varnish material is then removed as necessary, and the varnish material is cured to obtain the rotor 10, 20 according to the first or second embodiment described above.

The method for manufacturing a rotor according to the present embodiment makes it possible to realize desired immersion in which a varnish material is supplied to the coils 13 from one axial-end side using the rotor assembly 10A, which is provided with the end rings 14 described above, and air readily escapes from the other axial-end side. The method for manufacturing a rotor according to the present embodiment thereby makes it possible to coat the entirety of the surfaces of the coils 13 with the varnish without performing a complicated operation.

A method for manufacturing a winding field rotor according to the present embodiment is suitable for manufacturing the rotor 20 according to the second embodiment described above, the method including manufacturing a winding field rotor obtained by coating coils 13 in a rotor assembly 20A with varnish.

Specifically, the same operation as that in the method for manufacturing a rotor according to the first embodiment is performed, except that there is used a rotor assembly 20A in which the inside diameter of a circular opening 14*b* formed by the flange part 14B of the end ring 14 on the axial-end side (the right side in FIG. 4) is greater than the inside diameter of a circular opening 14*b* formed by the flange part 14B of the end ring 14 on the other axial-end side.

The method for manufacturing a rotor according to the present embodiment makes it possible to realize desired immersion in which a varnish material is supplied to the coils 13 from one axial-end side using the rotor assembly 20A, which is provided with the end rings 14 described above, and air more readily escapes from the other axial-end side. The method for manufacturing a rotor according to the present embodiment thereby makes it possible to more reliably coat the entirety of the surfaces of the coils 13 with the varnish without performing a complicated operation.

A device 50 for manufacturing a winding field rotor according to the present embodiment is suitable for manufacturing the rotor 10, 20 according to the first or second embodiment described above. The present embodiment shall be described citing, as an example, a case where the rotor 10 according to the first embodiment is manufactured (refer to FIGS. 5 to 7). For the rotor assembly 10A in FIGS. 5 and 7, a state is shown in which the rotor assembly 10A is sectioned along line II''-II' shown in FIG. 1. No fastening members are shown in the rotor assembly 10A in FIGS. 5 and 7.

Figure 6:
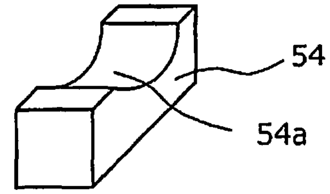
FIG. 6 is a perspective view schematically showing a base shown in FIG. 5.

As shown in FIGS. 5 and 6, the device 50 for manufacturing a winding field rotor according to the present embodiment comprises rotary devices 51 and a varnish material supply tank 52. The rotary devices 51 cause the rotor assembly 10A to rotate about an axis as indicated by arrow Z, the axial direction of the rotor assembly 10 being positioned along a horizontal direction (the left-right direction in FIG. 5). Using the varnish material supply tank 52, a varnish material V is supplied through a gap 10*a* between a rotor shaft 11 and a flange part 14B on one axial-end side (the right side in FIG. 5) to immerse, in the varnish material V, a coil end part 13A on the one axial-end side at the lower side of the winding field rotor assembly 10A.

In the present embodiment, the manufacturing device 50 furthermore comprises a varnish material tank 53, the varnish material tank 53 having a base 54 provided inside the varnish material tank. The base 54 has a concaved surface 54*a* abutting the outer peripheral surface of the rotor assembly 10A and is formed so as to divide the varnish material tank 53 into the varnish material supply tank 52 on the one axial-end side and a first varnish material recovery tank 55 on the other axial-end side.

In the base 54, the concaved surface 54*a* abuts the outer peripheral surface of the rotor assembly 10A, thereby suppressing or preventing the varnish material V from being discharged from the varnish material supply tank 52 to the first varnish material recovery tank 55 as indicated by arrow n (refer to FIG. 7(A)).

In the present embodiment, the first varnish material recovery tank 55 has a varnish material discharge hole 55*a*, the varnish material discharge hole 55*a* being provided at such a position that a varnish material liquid surface in the first varnish material recovery tank 55 and the outer peripheral surface of the rotor assembly 10A are set apart. It is also permissible to cut away a portion of a tank wall of the first varnish material recovery tank without providing a discharge hole (refer to FIG. 7), provided that the varnish material liquid surface in the first varnish material recovery tank 55 and the outer peripheral surface of the rotor assembly 10A can be set apart.

In the present embodiment, the manufacturing device 50 furthermore comprises a second varnish material recovery tank 56 by which the varnish material V discharged from the varnish material supply tank 52 or through the varnish material discharge hole 55 is recovered.

In the present embodiment, the second varnish material recovery tank 56 is furthermore configured to be capable of recovering varnish material (not shown) that is discharged through holes 14*a* so as to be dispersed. Specifically, the size (area) of the second varnish material recovery tank 56 within which varnish material is received is greater than that of the first varnish material recovery tank 55.

The varnish material V is supplied from a varnish tank (not shown) to the varnish material supply tank 52 as indicated by arrow a. Furthermore, the varnish material V is supplied from the varnish material supply tank 52 to the coil end parts 13A through the gap 10*a* or the holes 14*a* as indicated by arrows B and y and is furthermore supplied to the entirety of the coils 13. The varnish material V with which the coil 13 has not been impregnated is recovered in the first varnish material recovery tank 55, or is discharged from the varnish material supply tank 52 to the second varnish material recovery tank 56 as indicated by arrow 8 and recovered in the second varnish material recovery tank 56. The varnish material V that is recovered in the first varnish material recovery tank 55 is discharged from the first varnish material recovery tank 55 to the second varnish material recovery tank 56 as indicated by arrow ε and recovered in the second varnish material recovery tank 56. The varnish material V that is recovered in the second varnish material recovery tank 56 is discharged from the second varnish material recovery tank 56 to the varnish tank as indicated by arrow ζ and recovered in the varnish tank.

Figure 7:
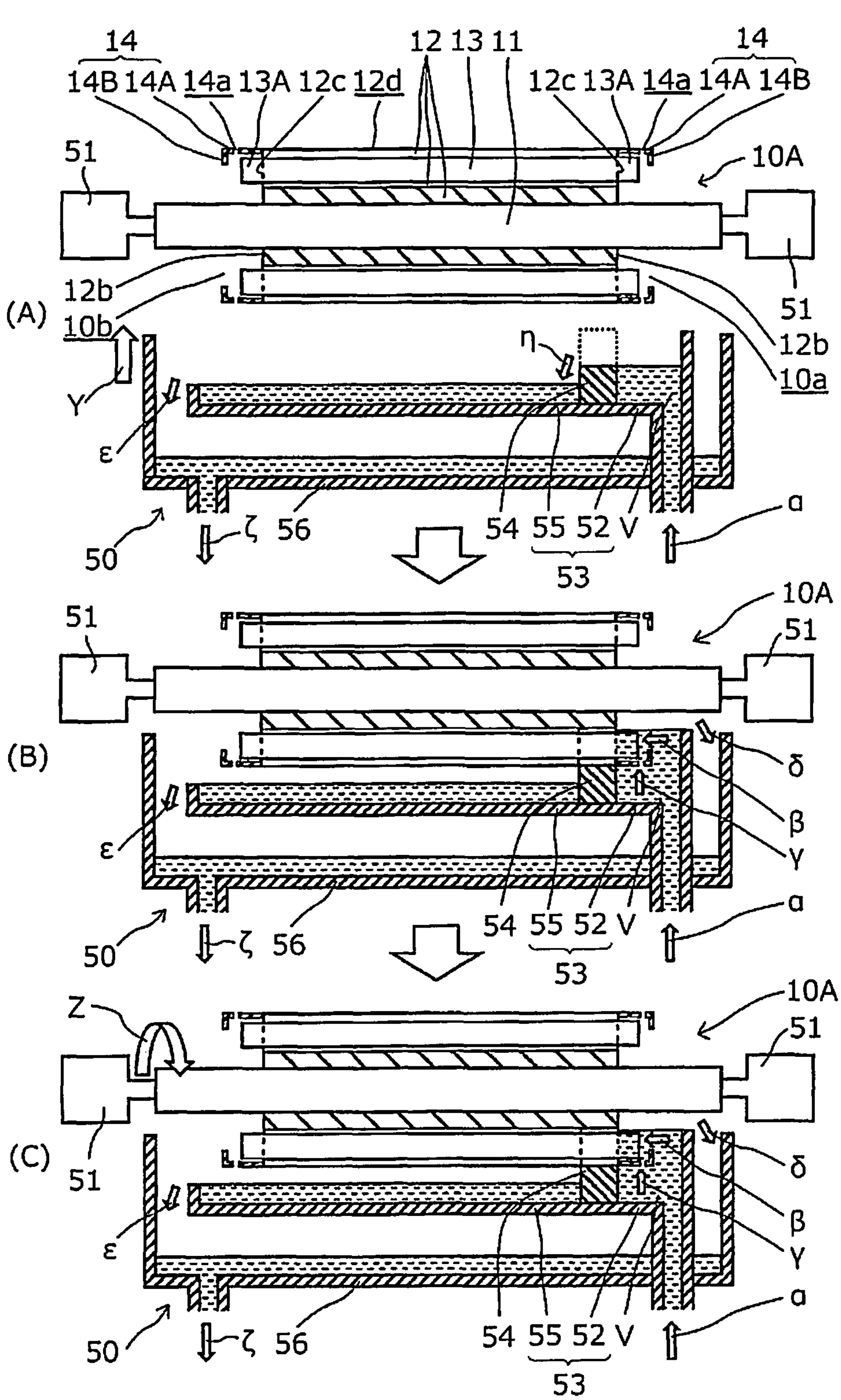
FIG. 7 is an explanatory diagram schematically showing an action of the device for manufacturing a winding field rotor shown in FIG. 5.

As shown in FIG. 7(A), the rotor assembly 10A, which is held by the rotary devices 51 and for which the axial direction is positioned along a horizontal direction (the left-right direction in FIG. 7), is disposed above the varnish material supply tank 52 or the like. Furthermore, the varnish material supply tank 52 or the like is raised relative to the rotor assembly 10A as indicated by arrow Y.

As shown in FIG. 7(B), when the concaved surface 54*a* of the base 54 abuts the outer peripheral surface of the rotor assembly 10A, the varnish material liquid surface in the varnish material supply tank 52 rises, and the varnish material V is supplied to the coil end parts 13A. In FIGS. 7(B) and 7(C), the constituent elements of the rotor assembly 10A are not assigned reference symbols.

As shown in FIG. 7(C), the rotor assembly 10A is caused to rotate about an axis by the rotary devices 51, and the varnish material is applied to the entirety of the surfaces of the coils.

After the varnish material V is applied to the entirety of the surfaces of the coils 13 of the rotor assembly 10A, the varnish material supply tank 52 or the like is lowered in the direction opposite from arrow Y, and immersion of the rotor assembly 10A in the varnish material V is ended. The same operation as that in the method for manufacturing a rotor described above is then performed.

The device 50 for manufacturing a rotor according to the present embodiment makes it possible to realize desired immersion in which a varnish material V is supplied by the varnish material supply tank 52 from one axial-end side using the rotor assembly 10A, which is provided with the end rings 14 described above, and air readily escapes from the other axial-end side. Specifically, the device 50 for manufacturing a rotor according to the present embodiment makes it possible to coat the entirety of the surfaces of the coils 13 with the varnish using a simple manufacturing device that does not require a complicated action to be performed. Because the varnish material V can also be supplied under applied pressure as necessary, supply of the varnish material V to the coils 13 can be promoted.

Furthermore, because the device 50 for manufacturing a rotor according to the present embodiment comprises the base 54 described above, the varnish material liquid surface in the varnish material supply tank 52 can be raised, and supply of the varnish material V to the coils 13 can be promoted.

Additionally, in the device 50 for manufacturing a rotor according to the present embodiment, because the first varnish material recovery tank 55 is provided with the varnish material discharge hole 55*a* described above, it is possible to prevent portions that do not require a varnish coating from being immersed in the varnish material V.

Furthermore, because the device 50 for manufacturing a rotor according to the present embodiment comprises the second varnish material recovery tank 56 described above, the varnish material V can be recovered without waste.

Additionally, in the device 50 for manufacturing a rotor according to the present embodiment, because the second varnish material recovery tank 56 described above is capable of recovering the varnish material V that is discharged from the holes 14*a*, the varnish material V can be recovered without waste.

A device 60 for manufacturing a winding field rotor according to the present embodiment is suitable for manufacturing the rotor 20 according to the second embodiment described above. Therefore, the present embodiment shall be described citing, as an example, a case where the rotor 20 according to the second embodiment is manufactured (refer to FIG. 8). For the rotor assembly 20A in FIG. 8, a state is shown in which the rotor assembly 20A is sectioned along line IV"-IV' shown in FIG. 3. No fastening members are shown in the rotor assembly 20A in FIG. 8.

As shown in FIG. 8, the device 60 for manufacturing a rotor according to the present embodiment comprises rotary devices 61 and a varnish material supply tank 62.

The rotary devices 61 cause the rotor assembly 20A to rotate about an axis as indicated by arrow Z, the axial direction of the rotor assembly 20A being positioned along a horizontal direction (the left-right direction in FIG. 5).

In the rotor assembly 20A, the inside diameter of a circular opening 14*b* formed by the flange part 14B of the end ring 14 on one axial-end side (the right side in FIG. 8) is greater than the inside diameter of a circular opening 14*b* formed by the flange part 14B of the end ring 14 on the other axial-end side. Therefore, by merely raising the varnish material supply tank 62 as described above, it is possible to supply the varnish material V through the gap 10*a* between the rotor shaft 11 and the flange part 14B on the one axial-end side and immerse, in the varnish material V, the coil end part 13A on the one axial-end side at the lower side of the rotor assembly 20A.

When the varnish material supply tank 62 is raised as described above, the varnish material liquid surface in the varnish material supply tank 62 is preferably lower than the flange part 14B of the end ring 14 on the one axial-end side and is higher than the flange part 14B of the end ring 14 on the other axial-end side.

The device 60 for manufacturing a rotor according to the present embodiment makes it possible to realize desired immersion in which a varnish material V is supplied by the varnish material supply tank 62 from one axial-end side using the rotor assembly 20A, which is provided with the end rings 14 described above, and air readily escapes from the other axial-end side. Specifically, the device 60 for manufacturing a rotor according to the present embodiment makes it possible to coat the entirety of the surfaces of the coils 13 with the varnish using a simple manufacturing device that does not require a complicated action to be performed.

The present invention has been described above using several embodiments but is not limited to these embodiments; various modifications are possible within the scope of the present invention.

For example, the constituent elements described above are not limited to the configurations indicated in the embodiments; the particulars of the specifications and materials of the rotor shaft, the rotor core, the coils, the end rings, and the slot seal can be modified, and the constituent elements of one embodiment can be applied to another embodiment.

In the rotor 10 according to the first embodiment, the peripheral surface parts 14A optionally has no holes 14*a*. Additionally, in the rotor 20 according to the second embodiment, the peripheral surface parts 14A optionally has holes 14*a*. Furthermore, the rotor 10 according to the first embodiment optionally is provided with the slot seal 15. Moreover, the rotor 20 according to the second embodiment optionally is not provided with the slot seal 15.

Additionally, the rotor 10 according to the first embodiment can be manufactured using the device 60 for manufacturing a rotor according to the second embodiment.

The invention claimed is:

1. A method for manufacturing a winding field rotor comprising a rotor shaft, a rotor core fixed to an outer periphery of the rotor shaft and having a plurality of slots with coils provided to the slots, and end rings fixed to both axial ends of the rotor core, the coils being coated with varnish, and having coil end parts protruding from both end surfaces of the rotor core and intermittently or continuously disposed on peripheral edge parts of both of the end surfaces, and each of the end rings having a peripheral surface part covering an entirety of an outer- peripheral side of the coil end parts, and a flange part protruding radially inward from an axial-end side of a peripheral surface part, the method comprising:

when coating the coils of a rotor assembly before coating the coils of the winding field rotor with the varnish, supplying a varnish material through a gap between the rotor shaft and the flange part on one axial-end side to immerse the coil end part on the one axial-end side at a lower side of the rotor assembly in the varnish material, while rotating the rotor assembly whose axial direction is aligned horizontally.

2. The method according to claim 1, wherein an inside diameter of a circular opening formed by the flange part of the end ring on the one axial-end side is greater than an inside diameter of a circular opening formed by the flange part of the end ring on the other axial-end side.

3. A manufacturing device for manufacturing a winding field rotor comprising a rotor shaft, a rotor core fixed to an outer periphery of the rotor shaft and having a plurality of slots with coils provided to the slots, and end rings fixed to both axial ends of the rotor core, the coils being coated with varnish, and having coil end parts that protrude from both end surfaces of the rotor core and intermittently or continuously disposed on peripheral edge parts of both end surfaces, and each of the end rings having a peripheral surface part covering an entirety of an outer- peripheral side of the coil end parts, and a flange part protruding radially inward from an axial-end side of a peripheral surface part, the manufacturing device for the winding field rotor comprising:

a rotary device for rotating a rotor assembly about an axis before the coils of the winding field rotor are coated with the varnish, the axial direction of the winding field rotor being horizontally aligned; and a varnish material supply tank for supplying a varnish material through a gap between the rotor shaft and the flange part on one axial-end side to immerse the coil end part on the one axial-end side at a lower side of the rotor assembly in the varnish material.

4. The manufacturing device according to claim 3, further comprising:

a varnish material tank, the varnish material tank having a base provided inside the varnish material tank, and the base having a concaved surface that abuts an outer peripheral surface of the rotor assembly, and the varnish material tank being partitioned into the varnish material supply tank on the one axial-end side and a first varnish material recovery tank on the other axial-end side.

5. The manufacturing device according to claim 4, wherein the first varnish material recovery tank has a varnish material discharge hole, and the varnish material discharge hole is provided at a position that separates a varnish material liquid surface in the first varnish material recovery tank from the outer peripheral surface of the rotor assembly.

6. The manufacturing device according to claim 5, furthermore comprising a second varnish material recovery tank for recovering the varnish material discharged from the varnish material supply tank or from the varnish material discharge hole.

7. The manufacturing device according to claim 6, wherein each of the peripheral surface parts have a plurality of holes that penetrate therethrough in a radial direction, and the varnish material discharged through the holes is recovered in the second varnish material recovery tank.

8. The manufacturing device according to claim 3, wherein an inside diameter of a circular opening formed by the flange part of the end ring on the one axial-end side is greater than an inside diameter of a circular opening formed by the flange part of the end ring on the other axial-end side, and a varnish material liquid surface in the varnish material supply tank is lower than the flange part of the end ring on the one axial-end side and is higher than the flange part of the end ring on the other axial-end side.

9. A winding field rotor comprising:

a rotor shaft, and a rotor core fixed to an outer periphery of the rotor shaft and having a plurality of slots with coils provided to the slots, the coils being coated with varnish, and having coil end parts protruding from both end surfaces of the rotor core and intermittently or continuously disposed on peripheral edge parts of both end surfaces, the winding field rotor further comprising:

end rings fixed to both axial ends of the rotor core;

each of the end rings having a peripheral surface part covering an entirety of an outer- peripheral side of the coil end parts, and a flange part protruding radially inward from an axial-end side of the peripheral surface part; and an inside diameter of a circular opening formed by the flange part of the end ring on the one axial-end side is greater than an inside diameter of a circular opening formed by the flange part of the end ring on the other axial-end side.

10. The winding field rotor according to claim 9, wherein each of the peripheral surface parts has a plurality of holes that penetrate therethrough in a radial direction.

11. The winding field rotor according to claim 9, further comprising a slot seal for sealing openings of the slots in the outer-peripheral-surface side of the rotor core, the slot seal being fixed to the rotor core.

12. A winding field rotating electric machine comprising the winding field rotor according to claim 9, and further comprising:

a winding field stator provided with an annular stator core and a coil provided to the stator core; and the winding field rotor being disposed inside the winding field stator.

* * * * *